Patented Dec. 10, 1935

2,023,887

UNITED STATES PATENT OFFICE 2,023,887

PROCESS OF TREATING FRESH CONCRETE

Orla E. Hood, Indianapolis, Ind.

No Drawing. Application February 25, 1935,
Serial No. 8,083

6 Claims. (Cl. 25—154)

In the fabrication of cement concrete structures, it has been found desirable, and in many instances necessary, to protect the exposed surfaces thereof during the setting interval (about three days) in order to prevent undesirable evaporation of water content, and for that purpose it has been common practice to either submerge the concrete in water or to apply to its exposed surfaces a moist blanket. For instance, in the construction of concrete pavements it has been common practice to apply to the upper exposed surface of a freshly laid pavement a blanket of burlap or straw to which water is added from time to time and with it, in many instances, a deliquescent salt, such as calcium chloride, is associated for the purpose of extracting desired moisture from the atmosphere. Such a procedure involves considerable expense both in the application and in the removal of the protecting blanket, and difficulty is also experienced in protecting vertical exposed surfaces because such protective blankets are not self-supporting, and therefore require additional retaining forms.

The object of my present invention is to provide an improved method of protecting the exposed surfaces of fresh cement concrete to retain therein an adequate volume of water of crystallization, the method being such that the expense of procedure may be materially reduced and such that vertical exposed surfaces may be protected without the use of retaining forms.

A further object of my invention is to provide a method whereby freshly-deposited cement concrete may be protected against freezing which would otherwise result because of freezing atmospheric temperatures.

Broadly stated, my invention resides in the application to freshly deposited cement concrete of a protective blanket of an adhesive layer of foam which will be stable for a period at least equal to the preliminary setting period of cement concrete (about three days) under all atmospheric conditions which are of such character as to tend to extract water from the cement concrete.

Any of the well-known fire-smothering foams would, to a certain degree, be useful as a protective blanket such as I have described, but all of such foams, so far as I am aware, are too costly and many of them would be objectionable because of their corrosive qualities, and all, so far as I am aware, will freeze at temperatures well above atmospheric temperatures commonly experienced in many parts of the country.

In order, therefore, to attain the best results, I prefer to form the desired blanket from a foam produced by blowing air into and through a liquid comprising a chloride (or its equivalent), sulphite cellulose liquor, and glycerin foots, all in solution in water.

I am not able to state the exact chemical composition of the sulphite cellulose liquor. This material is the waste effluent from the digestion of wood by the sulphite process in the production of wood pulp for paper making. When it issues from the digester it is a syrup-like material, more or less viscous, depending upon its water content, and reducible by dehydration to a grannular solid, (commonly known as goulac), which may be returned to syrup form, (common'y known as glutrin), by the addition of water.

Glycerine foots is the residue, after extraction of glycerine, and perhaps some of the lye glycerine, from the unsaponified kettle residue in the production of soap.

Free flowing aqueous solutions of sulphite cellulose liquor and glycerine foots, when reduced to substantially equal specific gravities, are readily miscible. Aqueous solutions of those materials having relatively large proportions of water are also readily miscible and the above-described mixture, irrespective of its water content, is readily miscible in water solutions of chlorine salts.

A typical mixture, as a basis of the desired foam, may be produced as follows:

Mix together substantially equal parts of glycerine foots and sulphite cellulose liquor in aqueous solutions having about equal specific gravities. Of this mixture take from 1 to 5 gallons, depending upon the character and stability of foam desired, and mix the same with 200 pounds of calcium magnesium chloride in solution in water of sufficient volume to produce 47 gallons of salt solution.

There may be considerable variation in the relative amounts of sulphite cellulose liquor and glycerine foots, water content and chloride content. For instance, decrease of chloride content will raise the freezing point of the mixture; decrease of the combined glycerine foots and sulphite liquor content will increase the motility of the foam and decrease its stability. Increase of sulphite cellulose content, relative to the glycerine foots content tends to toughen the foam, and decrease its motility.

If air, under pressure, be blown into and through the above-described liquid, or if the liquid be sprayed through an atomizing nozzle, the desired foam will be produced in a stream which may be readily directed through a hose onto the surface of a pavement or upon exposed vertical surfaces, and a layer of foam of desired thickness may be produced.

This foam is adherent to the concrete, and stable, except under rain, at all atmospheric temperatures.

The above-described foam should not be directly applied to the concrete until just after initial set has occurred. This condition can be readily judged as having been reached when the exposed surface of the concrete just begins to lose the glossy appearance due to uncombined water. If the above-described foam is directly applied at an earlier stage the ingredients thereof will be absorbed by the concrete and result in deterioration of the concrete.

However, if a layer of thin paper, oiled if desired be first laid upon the exposed surface of the concrete, earlier application of the foam is not detrimental.

I have demonstrated that any of the chloride salts are satisfactory, so far as foam-forming qualities are concerned, but the cost of sodium chloride would probably be objectionable, and the presence of magnesium chloride content might possibly be objectionable. However, I have found that either calcium chloride or calcium magnesium chloride are well within practicable price range and, if the foam be not applied too soon, will not be detrimental to the concrete.

I have not yet completed my investigations into the question of what other substances might be used in place of the chloride salts which I have mentioned. I believe, however, that potassium carbonate, potassium chloride, barium bromide, potassium iodide, sodium bromide, magnesium bromide, magnesium chloride, anhydrous strontium bromide, potassium cyanide, lithium chloride, calcium nitrate, zinc chloride and sodium or potassium acetate, zinc chlorate, zinc nitrate, ferrous nitrate, cobaltous chlorate, nickel chlorate, aluminum nitrate and sodium sulphate are probably more or less equivalents.

The foam which I have described in detail is readily destructible by additional water. As a consequence it may be readily washed from the surface of the concrete after the expiration of the desired protection period, leaving no undesirable stains or odors. This foam, when prepared from the particular mixture described in detail above, will not freeze at temperatures as low as sixty degrees below zero Fahrenheit, and remains motile through all temperatures above that temperature, even to temperatures many hundreds of degrees above zero.

It is therefore a perfect insulator against transfer of heat to or from a fresh body of cement and is also a protection against water evaporation.

I claim as my invention:

1. A method of fabrication of cement concrete structures which comprises the step of direct application to an exposed surface of cement concrete, following initial set and within the period of final set, of a blanket of heat-insulating foam.

2. A method of fabrication of cement concrete structures which comprises the step of direct application to an exposed surface of cement concrete, following initial set and within the period of final set, of a blanket of heat-insulating foam, the film-forming material of which is an aqueous solution of sulphite cellulose liquor, glycerine foots and an inorganic salt.

3. A method of fabrication of cement concrete structures which comprises the step of direct application to an exposed surface of cement concrete, following initial set and within the period of final set, of a blanket of heat-insulating foam, the film-forming material of which is an aqueous solution of sulphite cellulose liquor, glycerine foots and an inorganic salt of the chloride group.

4. A method of fabrication of cement concrete structures which comprises the step of application to said concrete prior to the setting thereof, of a blanket of heat-insulating foam.

5. A method of fabrication of cement concrete structures which comprises the step of application to said concrete prior to the setting thereof, of a blanket of heat-insulating foam wherein the film-forming material is an aqueous solution of sulphite cellulose liquor, glycerine foots and an inorganic salt.

6. A method of fabrication of cement concrete structures which comprises the step of application to said concrete prior to the setting thereof, of a blanket of heat-insulating foam wherein the film-forming material is an aqueous solution of sulphite cellulose liquor, glycerine foots and an inorganic salt of the chloride group.

ORLA E. HOOD.